United States Patent [19]
Greek et al.

[11] Patent Number: 5,404,280
[45] Date of Patent: Apr. 4, 1995

[54] REMOTE CONTROLLED TELESCOPE FLASHLIGHT

[76] Inventors: John Greek, 1963 Feuereisen Ave., Ronkonkoma, N.Y. 11779; Adam Stein, 8 Greentree Dr., Oakdale, N.Y. 11769

[21] Appl. No.: 221,755

[22] Filed: Apr. 1, 1994

[51] Int. Cl.⁶ .......................... F21L 1/00; F21V 33/00
[52] U.S. Cl. ................................... 362/198; 362/191; 362/802; 362/253
[58] Field of Search ............... 362/198, 191, 253, 802, 362/109; 359/399, 441

[56] References Cited

U.S. PATENT DOCUMENTS

| | | | |
|---|---|---|---|
| 1,960,554 | 5/1934 | Siedentoff | 362/253 X |
| 1,991,997 | 2/1935 | Bauersfeld | 362/253 |
| 5,113,327 | 5/1992 | Levy | 362/109 |

FOREIGN PATENT DOCUMENTS

| | | | |
|---|---|---|---|
| 554052 | 3/1958 | Canada | 362/198 |
| 703744 | 2/1965 | Canada | 362/198 |

OTHER PUBLICATIONS

Orion Telescope Center, "Night Vision Flashlights", advertised in Astronomy Magazine, Feb. 1994, p. 66.
"Compact Astronomical Rotary Power 455 X Telescope", advertisement, p. 35 for Jason Telescopes, Inc., of Bausch and Lomb, in catalog of Damark International, Inc. of Minneapolis, Minn., Sep. 1993.

*Primary Examiner*—Ira S. Lazarus
*Assistant Examiner*—Thomas M. Sember
*Attorney, Agent, or Firm*—Alfred M. Walker

[57] ABSTRACT

A novel, remote controlled telescope flashlight is provided for use for a telescope operating in darkness. As an optical eyepiece is removed from the remote control eyepiece holder of the telescope, an automatic switch is thrown that powers the telescope flashlight. This flashlight, attached to the tripod leg of the telescope, illuminates the tripod tray where other eyepieces are stored. The automatic, instantaneous illumination makes the process of removing and replacing eyepieces faster and easier.

22 Claims, 9 Drawing Sheets

REMOTE CONTROLLED TELESCOPE FLASHLIGHT

FIELD OF INVENTION

This novel invention relates to a remote controlled flashlight for the purpose of illuminating a tripod tray while removing and replacing optical eyepieces. It also allows an improved and faster method of removing and replacing eyepieces before celestial objects can move out of the field of view.

BACKGROUND OF INVENTION

It is well known that operating a telescope in darkness is difficult and time consuming. The present invention is beneficial to reduce the difficulty and time spent removing and replacing eyepieces by providing a more convenient, instantaneous light source and a faster, improved method of viewing celestial objects.

Other telescope lighting fixtures and flashlights are known in the hobby for providing lighting effects. However, in prior telescope flashlight inventions the telescope operator must first search through darkness to find the telescope light and then throw a switch for illumination. Also, the time wasted searching for, and turning on and turning off these prior telescope lights will allow a celestial object to move out of the field of view. Due to this time consuming process a celestial object will have to be moved back into the field of view—wasting even more time.

If a common hand held flashlight is used to operate a telescope, then it will become difficult to remove and replace an eyepiece with this flashlight in hand.

In contrast to the aforementioned lighting inventions, the present invention does not have be searched for in darkness, does not waste valuable viewing time, and automatically illuminates and turns off as needed while the telescope is being operated.

Other prior telescope flashlights are designed to be place on the tripod tray which is meant for limited, optical eyepiece storage. In contrast, the present invention is secured to one tripod leg and doesn't waste a valuable eyepiece storage space on the tripod tray.

OBJECTS OF THE INVENTION

It is therefore an object of the present invention to provide an improved telescope light for use with a telescope.

It is a further object to provide an improved capability of operating a telescope in darkness.

It is a further object of the present invention to provide a novel, remote control eyepiece holder, or a novel remote switch fabricated within the barrel of a telescope in which this remote switch controls a light fixture or flashlight for illumination of a telescope tripod tray. This improves the task and speed of removing and replacing optical eyepieces while operating a telescope by removing steps created by previous inventions.

It is a further object of the invention to provide a novel means of instantly turning on a light for quickly removing and replacing an eyepiece before a celestial object moves out from the field of view.

It is a further object of the invention to provide an improved, stationary light while using star charts or other written materials.

It is a further object of the invention to provide a novel aid to operating a telescope in darkness, far superior to previously known lighting devices.

It is another object of the invention to provide a novel means of illuminating the surrounding darkness to transport the telescope to a different location is needed.

It is another object of the invention to provide a detachable, independent flashlight is needed.

It is another object of the invention to provide free hands during illumination, a novel improvement of previously known lighting devices.

It is another object of the invention to provide a novel, automatic, more convenient method of illumination for the telescope hobbyist than previously known lighting devices.

The above and other objects of the present invention will be apparent from the following description of the preferred embodiment, taken in consideration in connection with the accompanying drawings.

BRIEF DESCRIPTION OF THE DRAWINGS

The accompanying drawings show some of the various embodiments of the present invention, as noted in the appended claims.

DETAILED DESCRIPTION OF THE DRAWINGS

Figure 1:
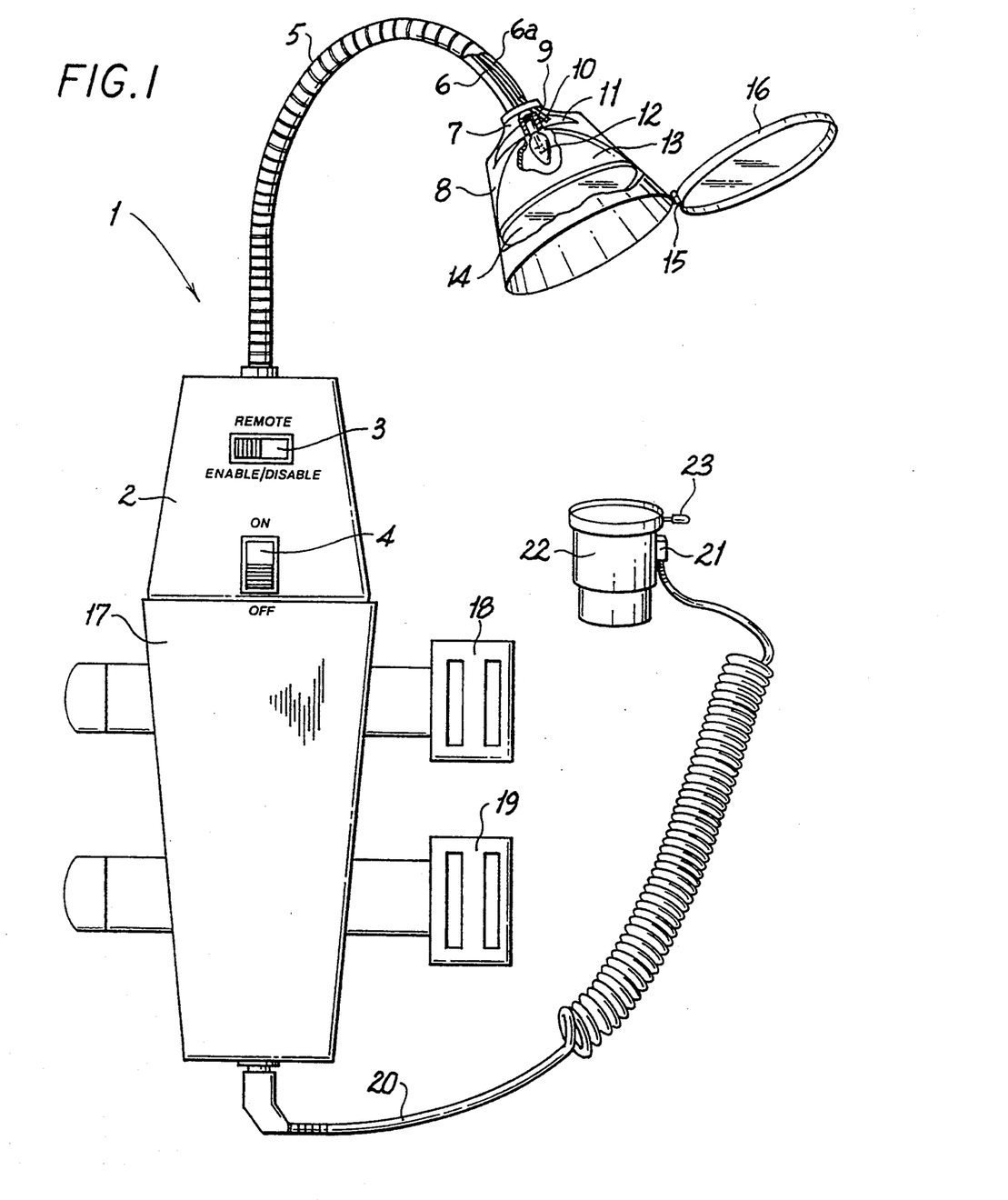
FIG. 1 is a front perspective view in partial section of the remove controlled telescope flashlight apparatus seated within its' holding case, and shown with the coiled electrical line attached to the eyepiece holder.

Referring to FIG. 1, there is provided a remote controlled telescope flashlight having a light source 1 within a holding case represented by reference numeral 17. Light source 1 is connected to a means for selectively filtering out white light to enhance visual activity when using the telescope. Telescope light source 1 has one manual switch for enabling or disabling remote control represented by reference numeral 3 and one manual override switch 4 to turn on flashlight 1 at any time. A flexible connection such as goose neck 5 allows for directional control of light beam of telescope light 1. Within goose neck 5, wire 6a connects to light bulb socket 10 and negative terminal of power supply 30, such as a battery or outlet adaptor. Wire 6 electrically connects electrical bridge connection 9 and to the throws of enable/disable switch 3 and manual override switch 4. Fixed lamp case section 7 is physically attached to goose neck 5. Electrical bridge connection 9 is making contact with the electrical contact plate 11. Light bulb socket 10 is seated inside the contact plate 11. Detachable Light bulb 12 is inside light bulb socket 10.

For focusing light into a beam and for changing burnt out light bulbs, a lamp case 8 of telescope flashlight 1 is removable. A clear lens cap 14 protects detachable light bulb 12 and concave reflector 13 from outside damage. As a practical option, reference number 15 describes a hinge which allows a filter lens cap 16, such as a red filter, to be placed over the end of removable lamp case section 8 of telescope light 1. A red filter lens cap 16 prevents the telescope operator from exposing his or her eyes to incandescent white light while operating a telescope. Without this protection, a telescope operator would have to wait until his or her vision adjusted again to clearly see a celestial image.

Flashlight 2 is seated within flashlight holding case 17. Fasteners, such as hook and loop type velcro straps 18 and 19 are for securing holding case 17 to the telescope, such as at the tripod leg 31. Coiled electrical line 20 connects the holding case 17 to the remote electrical switch 21. A remote switch 21 may be part of the eyepiece holder 22. This eyepiece holder 22 is to be secured to the barrel of a telescope and a desired eyepiece is placed within this holder 22. Electrical switch 21 is electrically connected to coiled electrical line 20. This switch is thrown when a eyepiece is removed from the eyepiece holder 22. A standard thumb screw 23 is described for holding an eyepiece within the holder 22.

Figure 2:
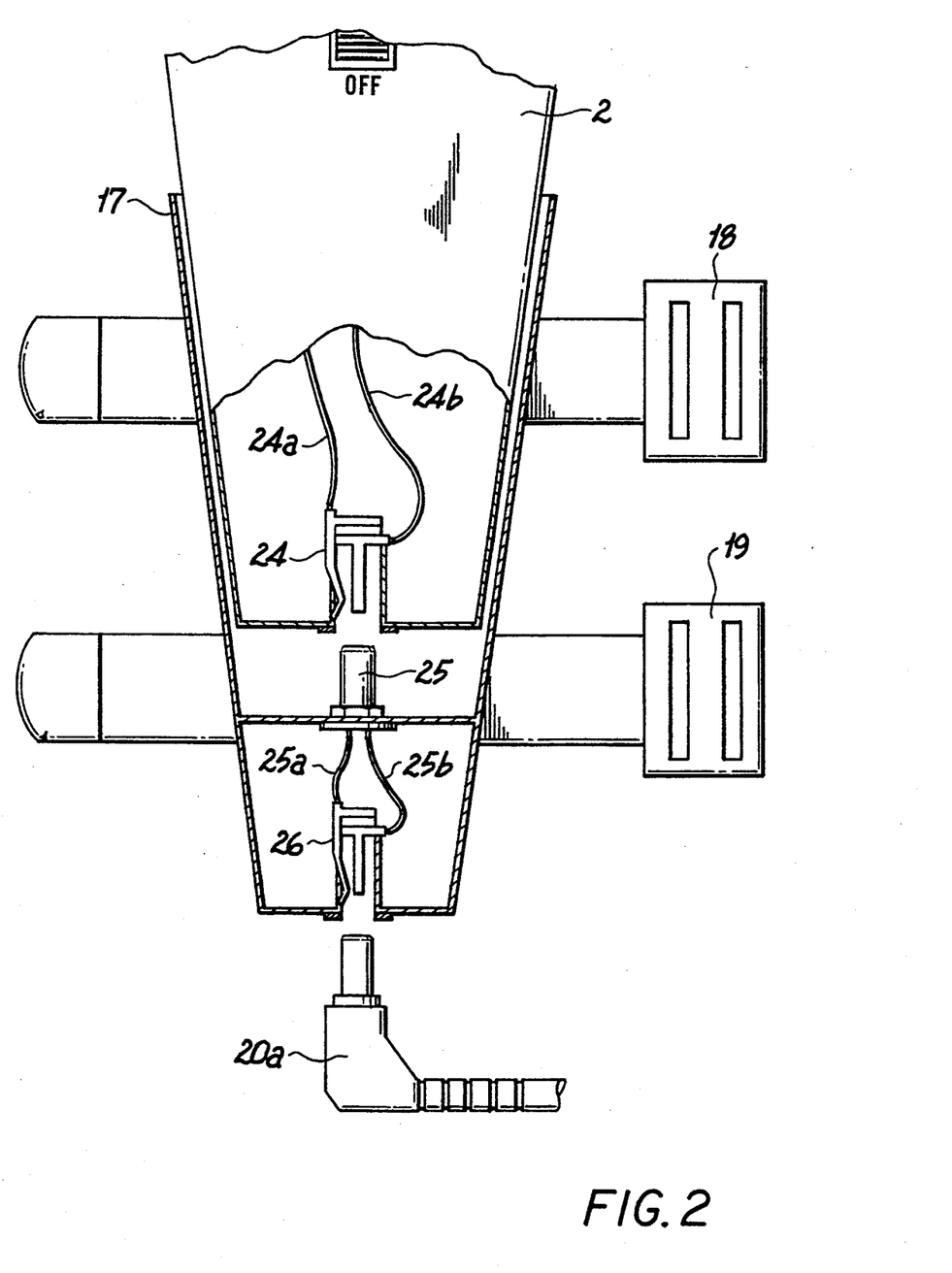
FIG. 2 is a close up fragmentary, front elevational view in partial section of the telescope light holding case of the flashlight apparatus as in FIG. 1, showing means of electrical connection to the flashlight and the coiled electrical line.

FIG. 2 shows a front-side view of the holding case 17 with the flashlight 2 directly above. Reference number 24 describes a female jack socket fabricated within the flashlight 2. Electrical wire 24a connects the female jack socket 24 and to the pole of enable/disable switch 3. Electrical wire 24b connects to the female jack socket and to the pole of manual override switch 4 and with the positive terminal of the battery supply 30. This female jack socket 24 is meant to connect with male jack plug 25 directly below flashlight 2. Male jack plug 25 is fabricated inside flashlight holding case 17. Electrical wires 25a and 25b connect male jack plug 25 to female jack socket 26.

Female jack socket 26 is fabricated to the bottom, inside of flashlight holding case 17. Female jack socket 26 is meant to receive male jack plug 20a of coiled electrical line 20. Velcro straps 18 and 19 are also described.

Figure 3:
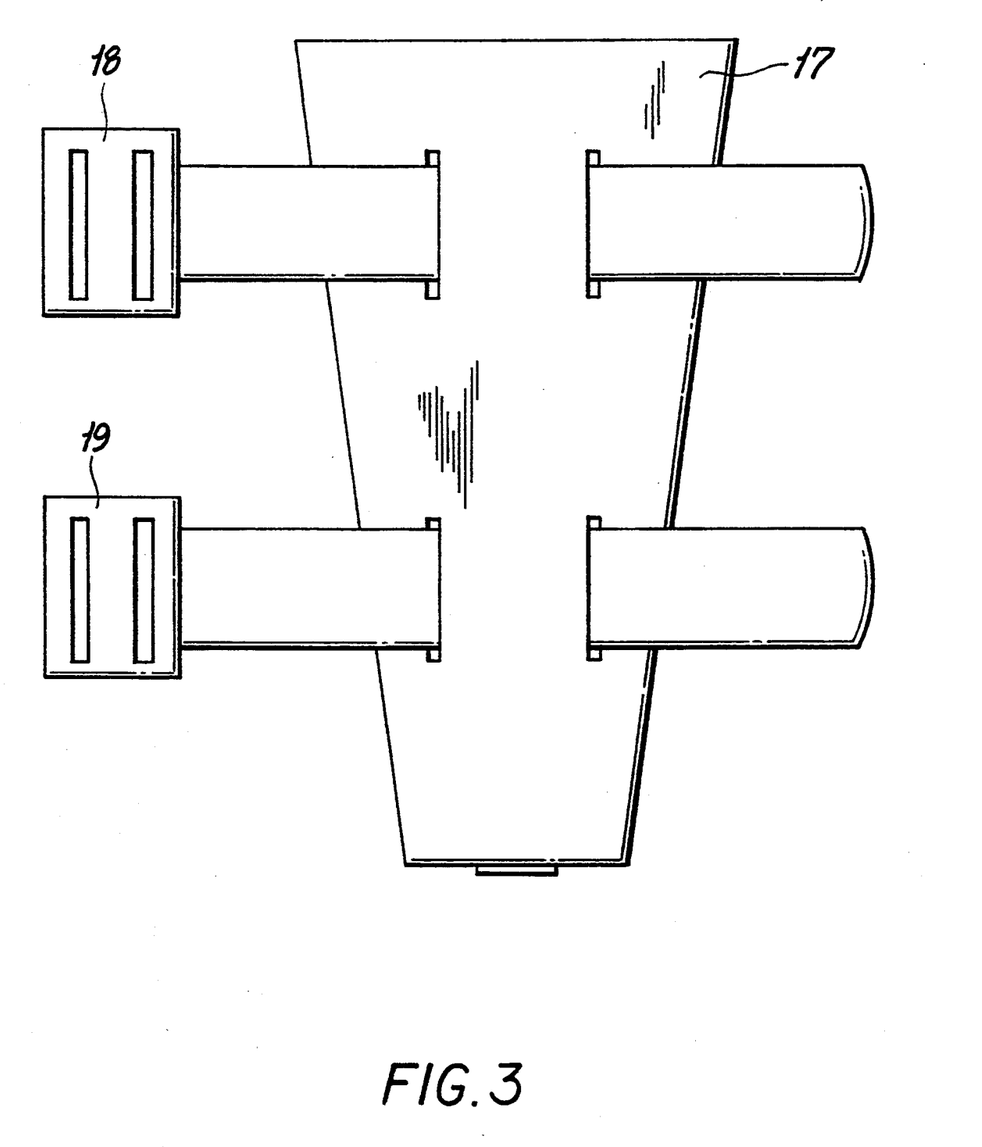
FIG. 3 is a close up rear elevational view of the telescope light holding case as in FIG. 2, showing means of attachment to telescope tripod leg.

FIG. 3 shows a back-side view of the holding case 11. Velcro straps 18 and 19 are shown to allow the holding case 17 to be fastened to the leg of a tripod 31.

Figure 4:
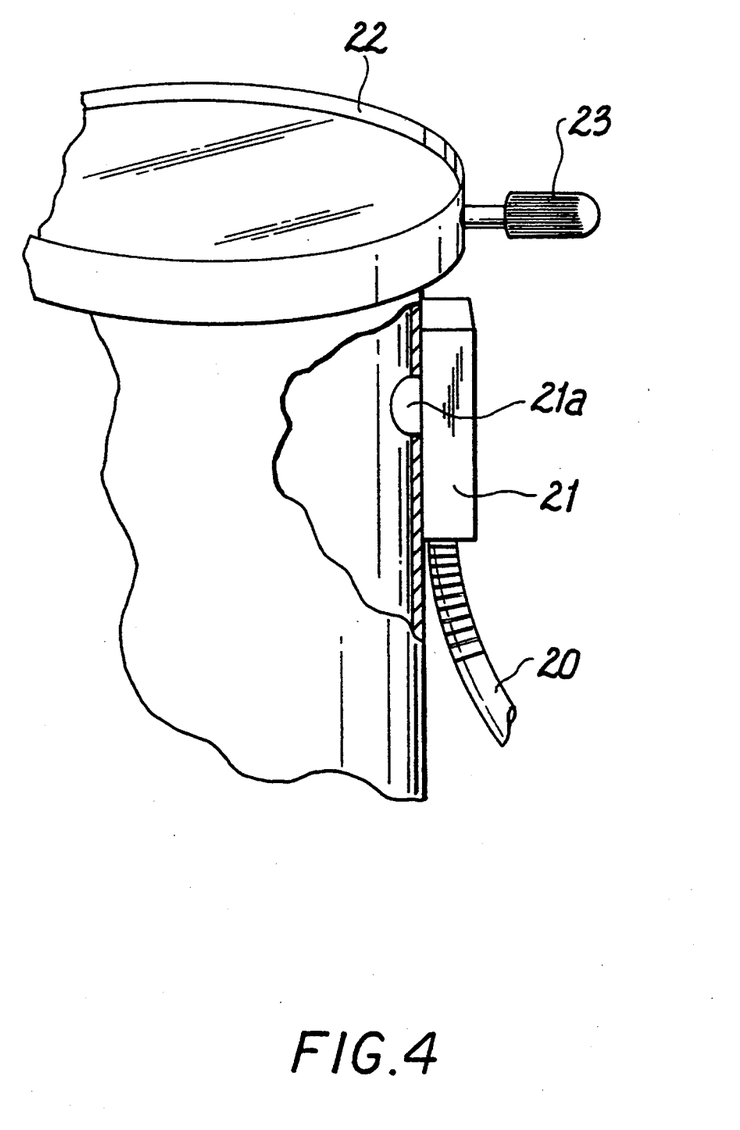
FIG. 4 is a close up fragmentary perspective view in partial section of the remote control eyepiece holder and the remote electrical switch of the flashlight apparatus as in FIG. 1.

FIG. 4 shows a fragmentary, semi-sectional view of the eyepiece holder 22. Coiled electrical line 20 and remote electrical switch are attached to the outside surface of holder 22. The remote electrical throw 21a of switch 21 is located inside the holder 22. Standard thumb screw 23 is also shown.

Figure 5:
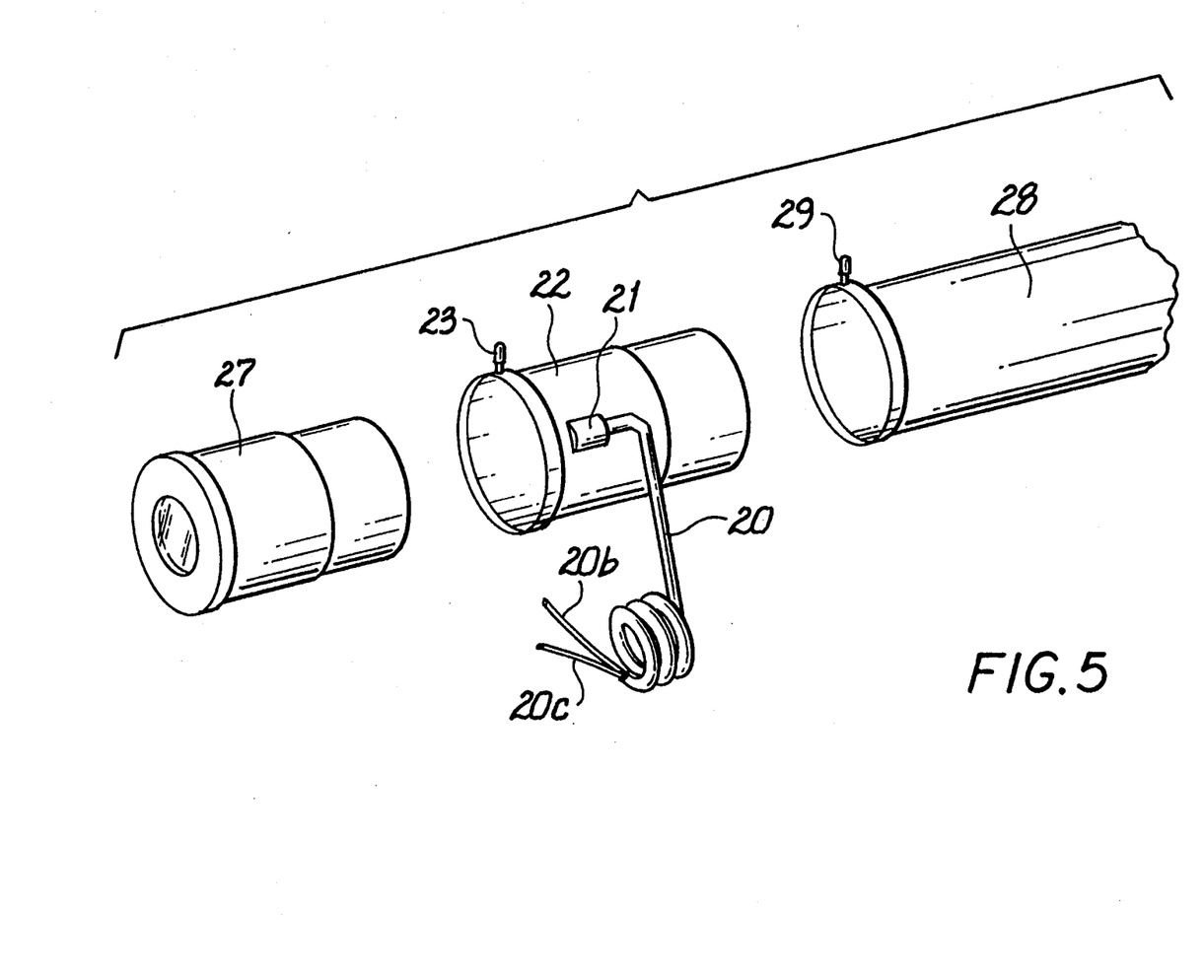
FIG. 5 is an exploded perspective view of the remote control eyepiece holder of the present invention, shown with an eyepiece and the barrel of a refractor telescope.

FIG. 5 is a side view of an optical eyepiece 27, eyepiece holder 22 and the fragmentary barrel of a telescope 28. Remote electrical switch 21, coiled electrical line 20 is shown with two internal wires described 20b and 20c. Standard thumb screws 23 and 29 are also shown.

Figure 6:
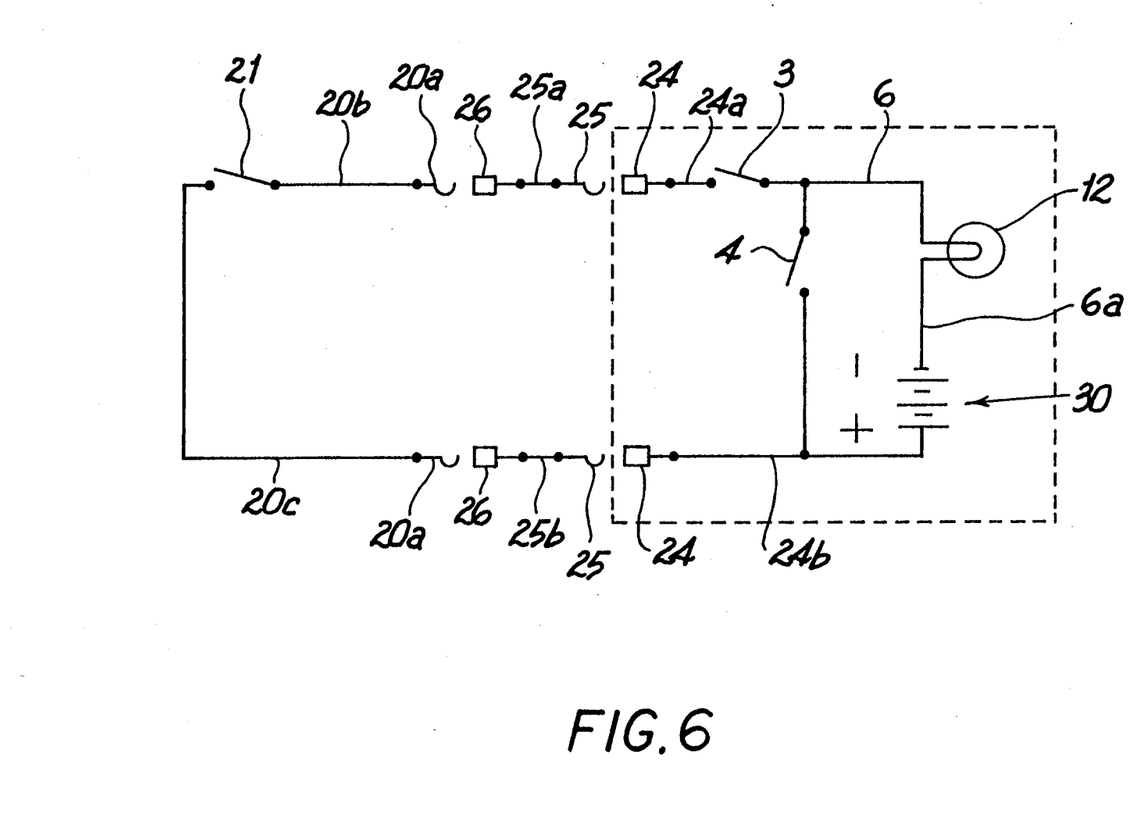
FIG. 6 is a electrical schematic diagram of the invention.

FIG. 6 is an electrical schematic diagram of the invention. Enable/disable remote switch 3 for selectively connecting the light source 1 to the power source 30, is a single pole single throw switch. Manual override switch 4 is also a single pole single throw switch. The light bulb 12 is described along with the battery supply 30. An electrical line 6 connects the light bulb 12 with the throws of switches 3 and 4. An electrical wire 24b connects the battery supply with the pole of switch 4 and one terminal of female jacket socket 24. An electrical wire 24a connects the other terminal of female jack socket 24 with the pole of switch 3. The previous is contained within the flashlight 2 as designated by the dotted line in the schematic. Male jack plug 25 is connected with wires 25a and 25b to female jack socket 26 of the holding case 17. The detachable male jack plug 20a is connected to coiled electrical wires 20b and 20c. Wires 20b and 20c are connected to the remote electrical switch 21.

Figure 7:
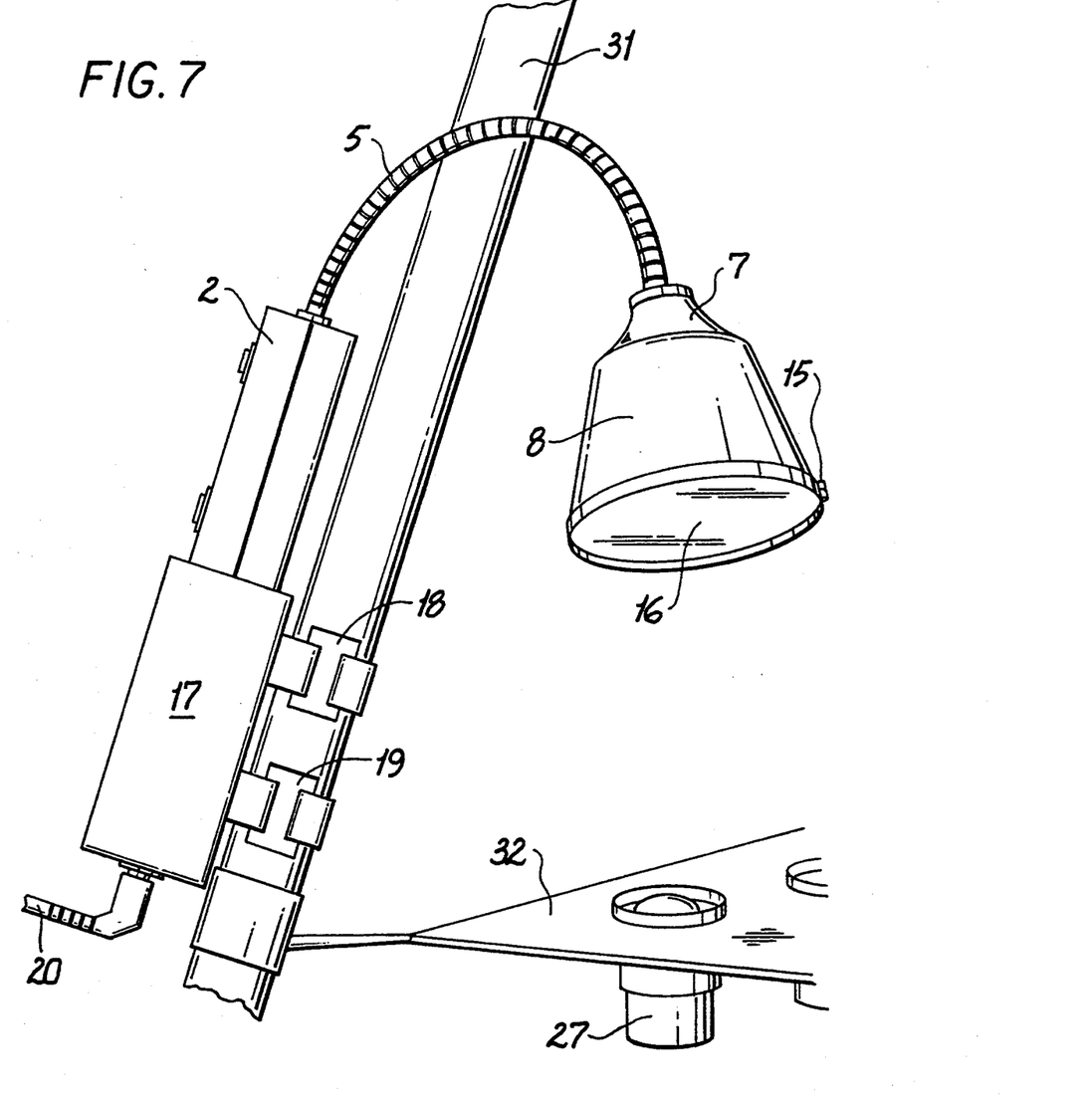
FIG. 7 is a close up fragmentary side perspective view of the remote controlled telescope flashlight shown attached to a fragmentary view of a tripod leg and a fragmentary view of a tripod tray of a telescope.

FIG. 7 shows flashlight 2 seated within its holding case 17, attached to a tripod leg 31 with velcro straps 18 and 19. A fragmentary view of a tripod tray 32 is shown where eyepiece 27 is stored. Red filter lens cap 16 is shown covering the removeable lamp case section 8.

Figure 8:
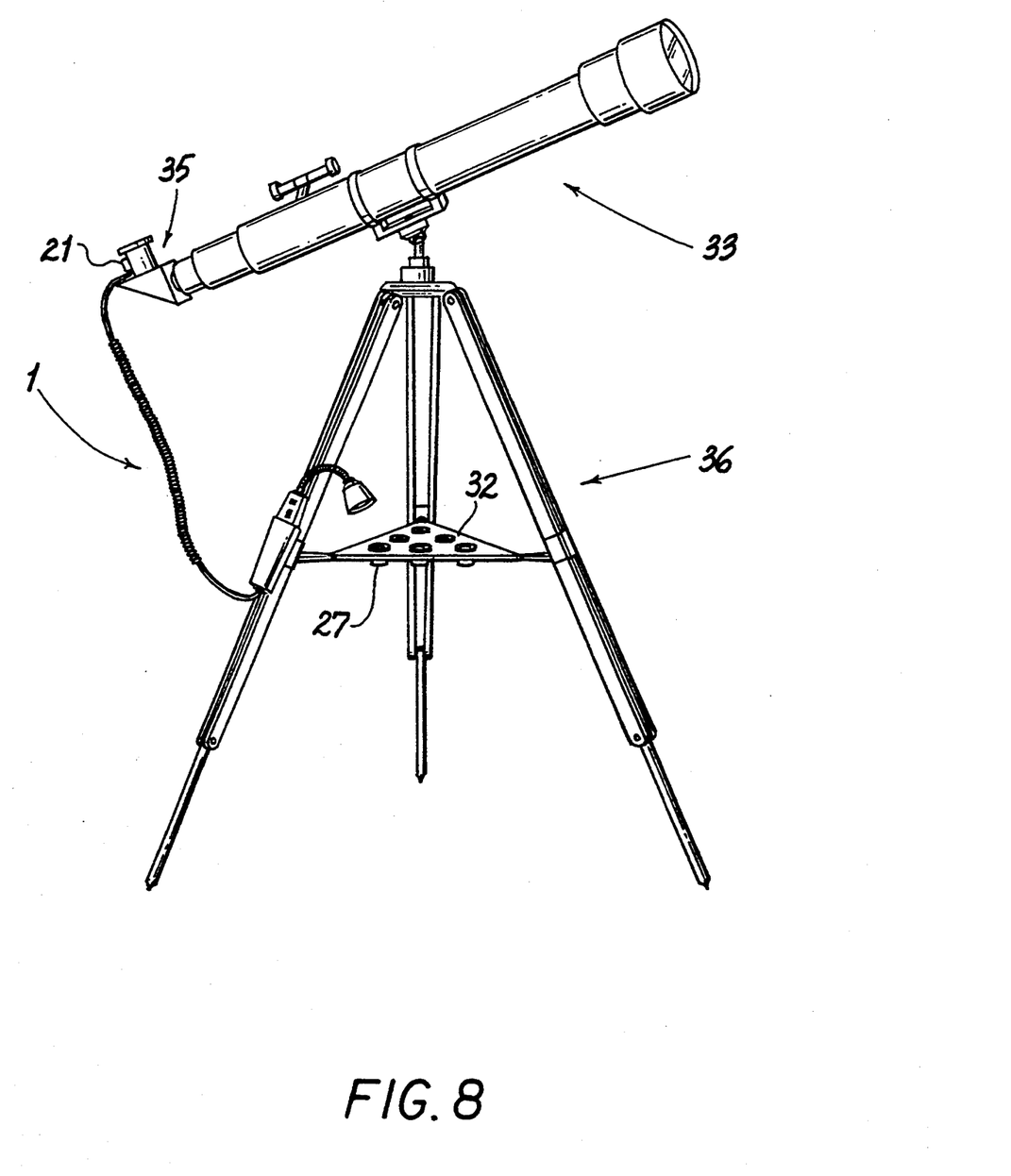
FIG. 8 is a side perspective view of the flashlight apparatus of the present invention, show with a refractor telescope and tripod.

FIG. 8 is a side view of a refractor telescope 33 using a star diagonal mirror 35 with remote electrical switch 21, tripod 36, tripod tray 32 for storing optical eyepieces 27 and a remote controlled telescope flashlight 1.

Figure 9:
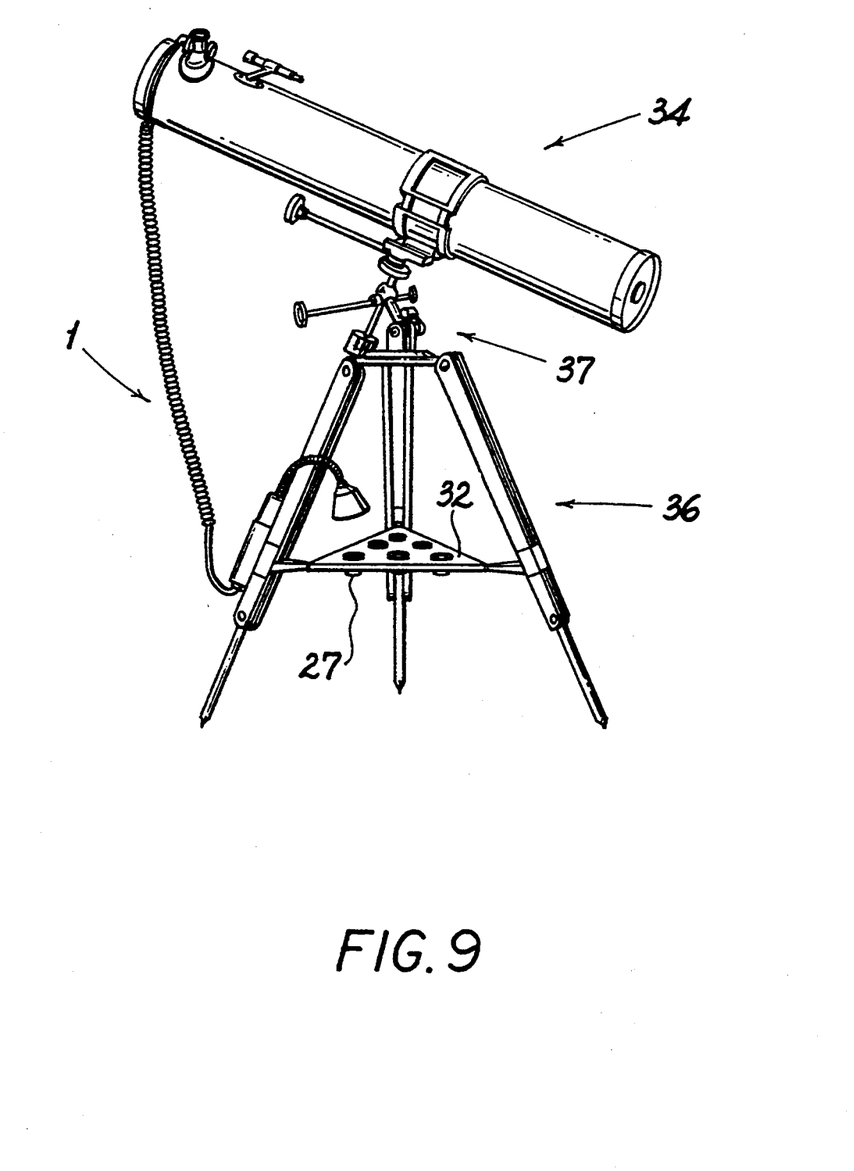
FIG. 9 is a side perspective view of the flashlight apparatus of the present invention, shown with a reflector telescope and tripod.

FIG. 9 is a side view of a reflector telescope 34, equatorial mount 37, tripod 36, tripod tray 32 for storing optical eyepieces 27 and a remote controlled telescope flashlight 1.

In summary, the present invention includes a remote controlled telescope flashlight 1, comprised of flashlight 2, holding case 17 and a remote control eyepiece holder 22 for use.

For installation, the holding case 17 is attached to one tripod leg 31 using the velcro straps 18 and 19. The flashlight 2 with batteries installed is then placed into the holding case 17 making an electrical connection between the female jack socket 24 and the male jack socket 25. Then the remote control eyepiece holder 22 is placed into the barrel of a telescope 28 and secured with a thumbscrew 29. The male jack plug 20a is plugged into the female jack socket 26 of the holding case 17. The coiled electrical line 20 now connects the remote control eyepiece holder 22 to the flashlight 2.

Then the disabling remote switch 3 is thrown to the enable mode and the manual override switch 4 is thrown to the off setting. Now, at this time, the light bulb 12 of the flashlight 2 is emitting light. The red filter lens cap 16 is placed over the removeable lamp case section 8 of telescope light 1. The goose neck 5 of the telescope light 1 is adjusted to direct the light emitted over the tripod tray 32. An optical eyepiece 27 is selected and then placed into the remote control eyepiece holder 22 which opens the normally closed remote electrical switch 21. The light bulb 12 of the flashlight 2 stops the emitting light.

When the optical eyepiece 27 is removed from the remote control eyepiece holder 22, the remote switch 21 is thrown and completes the circuit to power the light bulb 12. The flashlight 2 is now emitting light over the tripod tray 32. The optical eyepiece 27 can be stored with the aid of the automatic light and a different optical eyepiece 27 can be selected. Once, a new optical eyepiece 27 is placed within the remote control eyepiece holder 22, the remote switch 18 opens the circuit and turns off the light bulb 12 of flashlight 2.

The remote controlled telescope flashlight 1 is a very useful, time saving device for any astronomer or hobbyist who views terrestrial objects such as landscapes and wildlife. The remote controlled telescope flashlight 1 is most effective when used to quickly remove and replace an optical eyepiece before a subject can move out of the field of view. Also, to aid the hobbyist when relocating the telescope to another location.

The benefits of the present invention are that it:

a) allows faster, improved, removal and replacement of optical eyepieces while operating a telescope in darkness, b) allows removal and replacement of an eyepiece before a subject can move out of the field of view, c) provides a stationary light for viewing star charts or other written material, d) provides a stationary light for transporting a telescope to another location in darkness, e) provides a totally hands free light while operating a telescope in darkness, f) is safe for use, g) provides a detachable, independent flashlight if needed.

DESCRIPTION OF THE PREFERRED EMBODIMENT

The remote controlled telescope flashlight 1 for telescope, constitutes a double wedge shaped flashlight 2 with female jack socket 24 underneath the base of the flashlight 2 and an enable/disable remote switch 3 and manual override switch 4 on the upper wedge section of the flashlight 2. Attached to the top of the upper wedge section is the goose neck 5 and then the removable lamp case 8. The hollow holding case 17 is wedged shaped to receive the base of the wedge shaped flashlight 2. Inside the base of the holding case 17 is a male jack plug 25 for attachment to the female jack socket 24 of the flashlight 2.

A female jack socket 24 is located at the bottom of the base of the holding case 17 for attachment to the male jack plug 20a. The male jack plug 20a is electrically connected to the remote electrical switch 21 by a coiled electrical line 20. The remote electrical switch 21 is attached to the remote control eyepiece holder 22. This eyepiece holder 22 can be manufactured to fit all sized eyepieces (examples 0.96", 1.25", and 2").

Other modifications may be made to the present invention, without departing from the spirit and scope of the present inventors, as noted in the appended claims.

We claim:

1. A remote controlled telescope flashlight for a telescope, comprising:

a detachable light source having a filter for filtering light from said light source;

a flexible directional control connecting said light source to an electrical power source;

a means for attaching said flashlight to the telescope;

a remote on-off switch connected to a telescope eyepiece holder for holding one of a plurality of eyepieces;

said switch being responsive to connecting said electrical power source to said light source when one eyepiece of said plurality is removed from said eyepiece holder.

2. The flashlight as in claim 1, wherein said light source is an incandescent lamp.

3. The flashlight as in claim 1, wherein said light source is a light emitting diode.

4. The flashlight as in claim 1, wherein said light source is a florescent lamp.

5. The flashlight as in claim 1, wherein said directional control is a flexible gooseneck tube having therein an electrical wire connecting said light source to said electrical power source.

6. The flashlight as in claim 1, wherein said means for attaching said flashlight to the telescope is a fastener fastening said electrical power source to a tripod leg of the telescope.

7. The flashlight as in claim 1, wherein said remote on-off switch being response to said disconnecting said electrical power source from said light source when one eyepiece of said plurality of eyepieces is placed within said eyepiece holder.

8. The flashlight as in claim 1, wherein an electrical circuit comprises a manual override switch for maintaining said electrical circuit in a closed mode for continuously supplying said electrical power from said electrical power source to said light source.

9. The flashlight as in claim 8, wherein said electrical circuit further comprises an enable-disable switch for activating said remote on-off switch in said eyepiece holder.

10. The flashlight as in claim 1, wherein said remote control switch of the eyepiece holder is manually openable and closeable.

11. The flashlight as in claim 8, wherein said manual override switch is manually openable and closeable.

12. The flashlight as in claim 9, wherein said enable-disable switch is manually openable and closeable.

13. The flashlight as in claim 1, wherein said remote control switch of the eyepiece holder is a mechanical type switch.

14. The flashlight as in claim 1, wherein said remote control switch of the eyepiece holder is an opto-electrical type switch.

15. The flashlight as in claim 1, wherein said power source includes alkaline type batteries.

16. The flashlight as in claim 1, wherein said power source includes an outlet adaptor engagable with an electrical outlet.

17. The flashlight as in claim 1, wherein said power source uses a rechargable battery.

18. The flashlight as in claim 1, wherein said filter removes a portion of the visible light spectrum.

19. The flashlight as in claim 1, wherein said filter is a red filter.

20. The flashlight as in claim 1, wherein said means for attaching said flashlight to the telescope includes a body for holding said power source and a strap enclosure.

21. The flashlight as in claim 20, wherein said strap enclosure includes a hook and loop fastener configuration.

22. A remote controlled telescope flashlight for a telescope, comprising:

a power source for a light source;

a remote control means for selectively enabling and disabling said power source to supply electrical power to said light source;

a flexible connecting tube containing therein a means for connecting said light source to said power supply;

a light transmittable means for filtering out a portion of the visible light spectrum from said light source;

a detachable cap for selectively engaging and disengaging said light transmittance means to and from said light source;

a container holding said power source; said container engagable with said flashlight; said container further engagable with a telescope support;

an eyepiece holder engagable with a barrel of the telescope said eyepiece holder connectable to said power source, said eyepiece holder having an electrical switch for selectively engaging and disengaging said electrical power from said power source to said light source, said eyepiece holder having a switch therein including a male jack connectable with a female jack socket within said holding container; said female jack socket engagable with further male jack within said holding container; said further male jack within holding container further connectable with female jack socket within said power source;

said switch within said eyepiece holder connectable to said male jack by a coiled wire;

said female jack socket within power source connectable by a first wire to a pole portion of an enable/-disable switch, a further wire connecting said female jack socket within power source to a pole of a manual override switch and a positive terminal of a battery supply within said power source.

* * * * *